United States Patent [19]

Tsujimura et al.

[11] Patent Number: 4,934,881
[45] Date of Patent: Jun. 19, 1990

[54] BALL END MILL

[75] Inventors: Osamu Tsujimura, Kawasaki; Yuzo Koesashi, Anpachi; Masayuki Okawa, Kawasaki, all of Japan

[73] Assignee: Mitsubishi Metal Corporation, Tokyo, Japan

[21] Appl. No.: 373,513

[22] Filed: Jun. 30, 1989

[30] Foreign Application Priority Data

Jul. 11, 1988 [JP] Japan .............................. 63-91697[U]

[51] Int. Cl.⁵ .......................... B23C 5/10; B23C 5/14
[52] U.S. Cl. ........................................ 407/42; 407/54; 407/118; 407/119
[58] Field of Search ..................... 407/42, 54, 118, 119

[56] References Cited

U.S. PATENT DOCUMENTS

| 4,280,774 | 7/1981 | Hayama | 407/42 |
| 4,521,172 | 6/1985 | Durand | 407/42 |
| 4,623,285 | 11/1986 | Costil | 407/42 |

FOREIGN PATENT DOCUMENTS

| 54-81583 | 6/1979 | Japan . |
| 58-98120 | 7/1983 | Japan . |
| 62-181309 | 11/1987 | Japan . |
| 62-181310 | 11/1987 | Japan . |
| 62-181311 | 11/1987 | Japan . |

Primary Examiner—William Terrell
Attorney, Agent, or Firm—Cushman, Darby & Cushman

[57] ABSTRACT

A ball end mill including an elongated body, a center insert, and a plurality of cutting inserts. The center insert and the cutting inserts are mounted on the forward end of the body. The center insert and each of the cutting inserts are adjacent to each other in such a manner that the center insert is located with a part thereof at the center. The center insert which is made of cemented carbide has cutting edges passing through the center axis. The cutting inserts are made of a super hard sintered compact. Each of the cutting inserts has a cutting edge aligned to the cutting edge of the center insert. The cutting edges of the cutting inserts and the center insert cooperate to draw a hemispherical path on rotation.

4 Claims, 3 Drawing Sheets

BALL END MILL

BACKGROUND OF THE INVENTION

1. Field of the Invention

The present invention relates to a ball end mill in which cutting edges at the forward end thereof describe a semi-spherical path on a rotation.

2. Related Art

FIGS. 5 and 6 depict a conventional ball end mill, the body 1 of which is circular in cross section and rotates about the center axis C thereof. At a forward end of the body 1 which is generally semi-spherical, four cutting inserts 2 are installed.

The cutting inserts 2 are made of, for example, a sintered CBN compact (sintered cubic boron nitride carbide compact) and formed as plates shaped like a boomerang. On the outer side of each of the cutting inserts 2, a cutting edge 2a is formed. The cutting inserts 2 are evenly disposed on the body 1, and angularly spaced at 90° about the center axis of the body 1. Each opposite pair of cutting edges 2a are disposed in a similar radial arrangement so that the whole of the cutting edges 2a define a semi-spherical path on rotation of the body 1.

Such a ball end mill is advantageous for high speed cutting because of the resistance to wear of the sintered CBN carbide cutting insert 2.

However, mainly during transverse traveling of the ball end mill, the forward end of the cutting insert 2 which is close to the center axis C receives a large thrust load because the rotating velocity thereat is low compared with more peripheral portions, so that the cutting resistance at the forward end is relatively high. Consequently, the cutting edges 2a at the forward end which are made of sintered CBN carbide are frequently damaged as the CBN carbide material is relatively brittle.

Especially, if a plurality of cutting edges are disposed so as to converge at the center axis C, each of the cutting edges 2a come into contact with the others at the center axis C in such a manner that the edges do not continue an unbroken line. Consequently, thickness T of the cutting edges 2a at the center axis C must be made thinner in order to achieve smooth cutting. Therefore, an increase in the number of cutting edges 2a is accompanied by greater tendency for damage to occur at the cutting edges.

SUMMARY OF THE INVENTION

It is therefore an object of the present invention to provide a ball end mill, wherein damage to the portion of the edges which are close to the center point is decreased, thereby enabling a stable cutting process to be performed.

In accordance with a preferred embodiment of the present invention, the ball end mill comprises an elongated body, a center insert made of a cemented carbide, and at least one cutting insert made of a super hard sintered compact.

The body has a center axis about which the body rotates and a forward end. The center insert is mounted on the forward end of the body adjacent to the center axis.

The center insert has at least one arc-shaped first cutting edge. The first cutting edge extends radially and passes through the center axis. The first cutting edge is convex forward.

The cutting insert is mounted on the forward end of the body extending from radially outward the center insert. The cutting insert has an arc-shaped second cutting edge in flush contact with the first cutting edge of the center insert and extending radially. The second cutting edge is convex forward, so that the first and second cutting edges of the cutting insert and the center insert respectively cooperate to draw a semi-spherical path on rotation about the center axis.

DETAILED DESCRIPTION OF THE PREFERRED EMBODIMENT

A preferred embodiment of the present invention will be described hereinafter with reference to the accompanying drawings.

Figure 1:
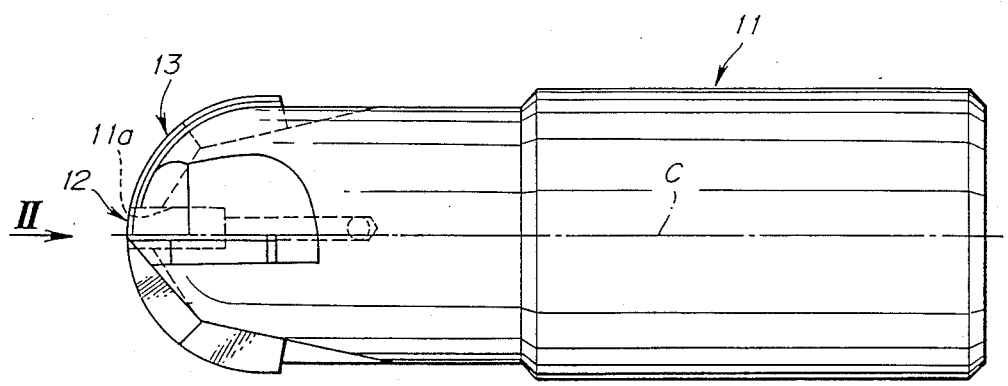
FIG. 1 is a side view of a ball end mill according to a preferred embodiment of the present invention.
Figure 2:
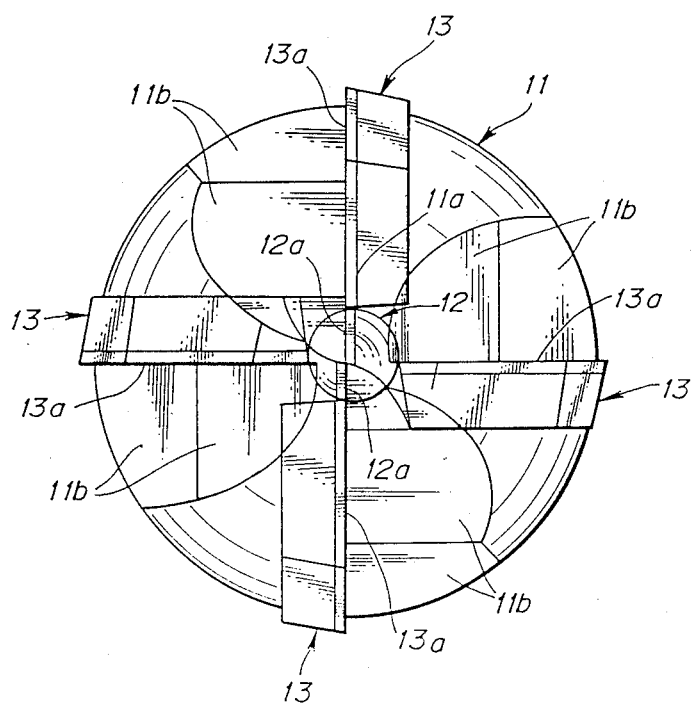
FIG. 2 is a front view of the ball end mill in FIG. 1.

FIGS. 1 and 2 depict a ball end mill of the present embodiment. The body 11, of a circular cross section, is rotated about a center axis C thereof. At the forward end of the body 11 which is generally semi-spherical, a center insert or rod insert 12 of a circular cross section is provided eccentric to the center axis of the body 11. Four cutting inserts 13 are installed in the forward end of the body 11 around the center insert 12.

Figure 3:
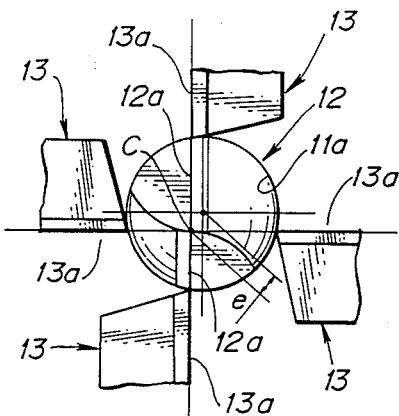
FIG. 3 is an enlarged front view of a principal portion of the ball end mill in FIG. 1.

The center insert 12 which is made of a cemented carbide is inserted into and brazed in a hole 11a of a circular cross section formed at the forward end of the body 11. The center of the hole 11a is parallel to and spaced apart a distance "e" from the center axis C of the body 11, as shown in FIG. 3. The distance "e" is preferably not less than 0.5 mm and not more than the raduis of the center insert 12. If the distance "e" is less than 0.5 mm, the eccentric offset of cutting inserts 13 mentioned in the following are insufficient. If the distance "e" is more than the radius of the center insert 12, the center insert 12 can not be positioned with a part thereof at the center C of the body 11. The diameter of the center insert 12 is preferably in a range from 1/10 to 1/5 of the diameter of the body 11. If the diameter of the center insert 12 is smaller than 1/10 of the diameter of the body 11, the cutting inserts 13 must be disposed so as to be close to the center axis C of the body 11, and consequently the cutting inserts 13 are easily damaged. If the diameter of the center insert 12 exceeds 1/5 of the diameter of the body 11, the angular velocity of second cutting edges 13a of the cutting inserts 13 is so high that the second cutting edges 13a are soon worn down.

The cutting inserts 13 are made of a super hard sintered compact, for example, a sintered CBN compact (sintered cubic boron nitride carbide compact), a sintered WBN compact (sintered wurtzite boron nitride compact), or a sintered diamond compact, and formed as plates shaped like a boomerang. On the outer side of each of the cutting inserts 13, an arc-shaped second cutting edge 13a is formed. The cutting inserts 13 are evenly disposed on the body 11, and angularly spaced at 90° about the center axis of the body 11, in a radial arrangement. Lines extended straight from the second cutting edges 13a pass through the center axis C. Portions of the second cutting edges 13a which are close to the center axis C contact the outer peripheral surface of the center insert 12. The cutting inserts 13 are mounted on the forward end of the body 11 in such a manner that the cutting inserts 13 are respectively received by and brazed to four recesses formed in the forward end. Four chip pockets 11b for relief chips are formed in front of the second cutting edges 13a in the forward end of the body 11.

At the forward end of the center insert 12, a pair of arc-shaped first cutting edges 12a are formed in a manner that the first cutting edges 12a continue from an opposite pair of second cutting edges 13a of the cutting inserts 13 through the center axis C of the body 11. Therefore, the first and second cutting edges 12a and 13a cooperate to draw a semi-spherical path on rotation about the center axis C.

The ball end mill is manufactured by such a process that after brazing the center insert 12 and the cutting insert 13 to the forward end of the body 11, the first and second cutting edges 12a and 13a and the chip pockets 11b are formed simultaneously. Accordingly, each of the adjacent cutting edges 12a and 13a are disposed on the same lines.

With the above construction, since the center insert 12 is made of a cemented carbide with high ductility, the first cutting edges 12a of the center insert 12 are resistant to damage even if the first cutting edges 12a receive a large thrust load and/or a large cutting resistance. Furthermore, even if a plurality of the cutting edges 12a and 13a are formed on the body 11, the lines passing through the cutting edges 12a and 13a can pass in a straight line through the center axis C of the body 11. Therefore, damage of the first cutting edges 12a can be decreased.

Figure 4:
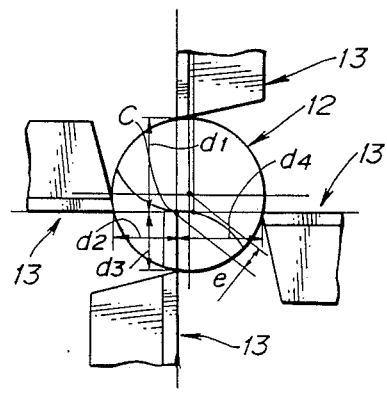
FIG. 4 is a front view showing the principal portion shown in FIG. 3 for description of dimensions.
Figure 5:
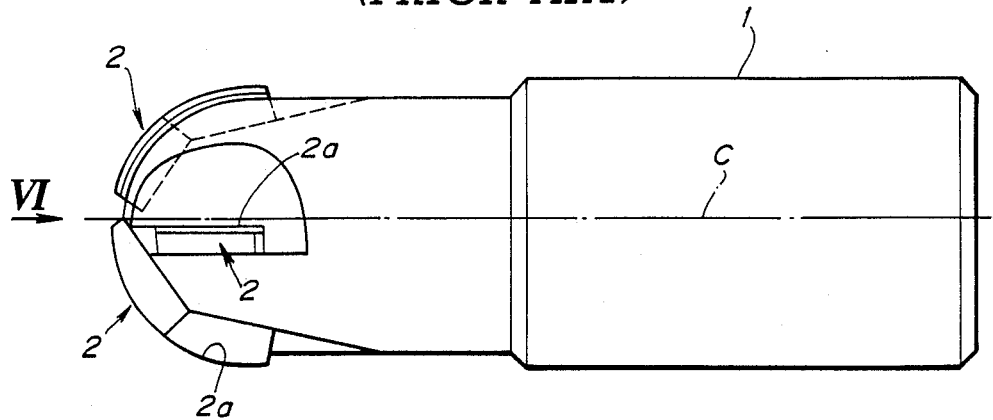
FIG. 5 is a side view showing a ball end mill of the prior art.
Figure 6:
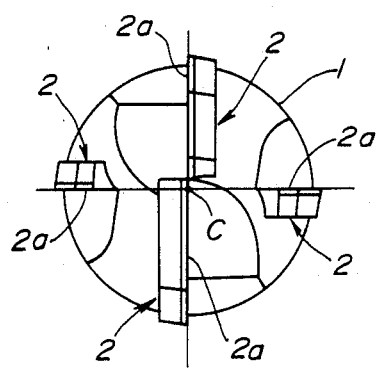
FIG. 6 is a front view showing the prior art ball end mill of FIG. 5.
Figure 7:
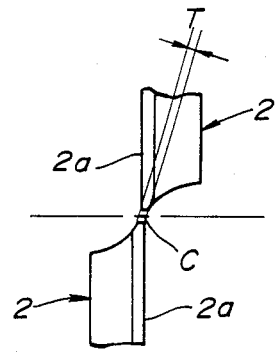
FIG. 7 is a front view showing a principal portion of another ball end mill to the present invention related.

Since the center insert 12 is provided to be eccentric to the center axis C of the body 11 at the distance "e", the cutting inserts 13 are disposed as shown in FIG. 4. In FIG. 4, distances d1, d2, d3, and d4 between the pointed forward ends of the cutting edges 13a and the center axis C of the body 11 can be different from each other. In other words, the cutting inserts 13 are not arranged concentrically around the center axis of the center insert 12. Hence, the volume cut by each of the cutting edges 13a can be uniform during the cutting process.

While the center insert 12 has a circular cross section in the above embodiment, the center insert could have a polygonal cross section.

What is claimed is:

1. A ball end mill comprising:
   an elongated body, said body having a forward end and a center axis about which said body rotates;
   a center insert made of a cemented carbide and mounted on said forward end of said body, said center insert being disposed so as to be intersected by the center axis, said center insert having at least one pair of first cutting edges, each of said first cutting edges being of an arc-shaped profile along a plane including said center axis of said body, each of said first cutting edges having a first planar cutting surface disposed in a plane which includes said center axis of said body and facing in the direction of rotation of said body, said arc-shaped profile being forwardly convex and projecting from the forward end of the body, said first planar cutting surfaces of said first cutting edges extending radially and intersecting said center axis; and
   a plurality of cutting inserts made of super hard sintered compact and mounted on said forward end of said body radially outward of said center insert, each of said cutting inserts having a second cutting edge, each of said second cutting edges being of an arc-shaped profile along a plane including said center axis of said body, each of said second cutting edges having a second planar cutting surface disposed in a plane which includes said center axis of said body, said arc-shaped profile of each of the second cutting edges being forwardly convex and projecting from the body, so that said first and second cutting edges of said center insert and said cutting inserts respectively cooperate to draw a hemispherical orbit on rotation about said center axis, said second planar cutting surfaces of said second cutting edges extending radially about the center axis of the body, at least one pair of the second planar cutting surfaces of said second cutting edges being flush continuous with said first planar cutting surfaces of said first cutting edges.

2. A ball end mill according to claim 1, said second cutting surfaces of said second cutting edges being disposed angularly symmetric about the center axis of said body, the radially inward ends of said second cutting edges being disposed at various distance from said center axis, the radially outward ends of said second cutting edges being equally spaced from said center axis.

3. A ball end mill according to claim 1, wherein said center insert has a radially symmetric cross section, and the center axis of said center insert is parallel to and eccentric to said center axis of said body, said radially inward ends of said second cutting edges of said plurality of cutting inserts are adjacent to the center insert so as to be spaced at various distances from said center axis.

4. A ball end mill according to claim 1, wherein said center insert has a circular cross section, and the center axis of said center insert is parallel and eccentric to said center axis of said body, said radialy inward ends of said second cutting edges of said plurality of cutting inserts are adjacent to the center insert so as to be disposed at various distances from said center axis.

* * * * *